O. KARCHER.
LAWN TRIMMER.
APPLICATION FILED JAN. 2, 1912.
1,037,634.
Patented Sept. 3, 1912.
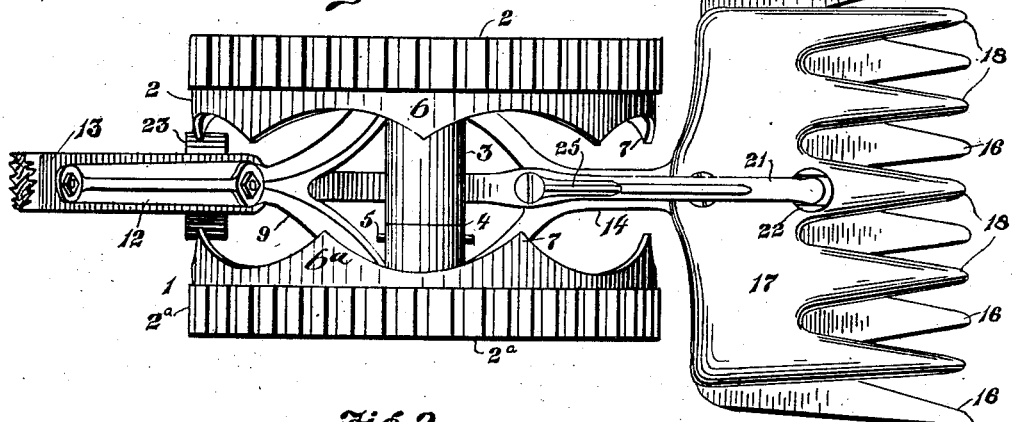
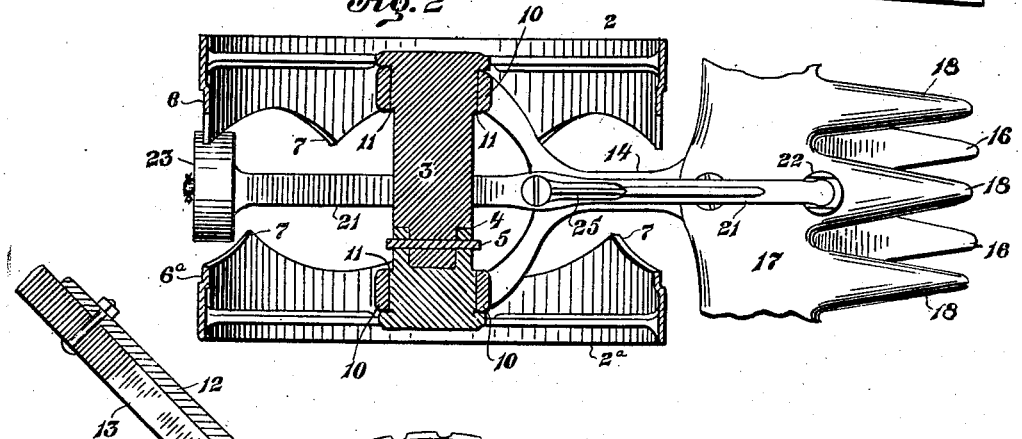
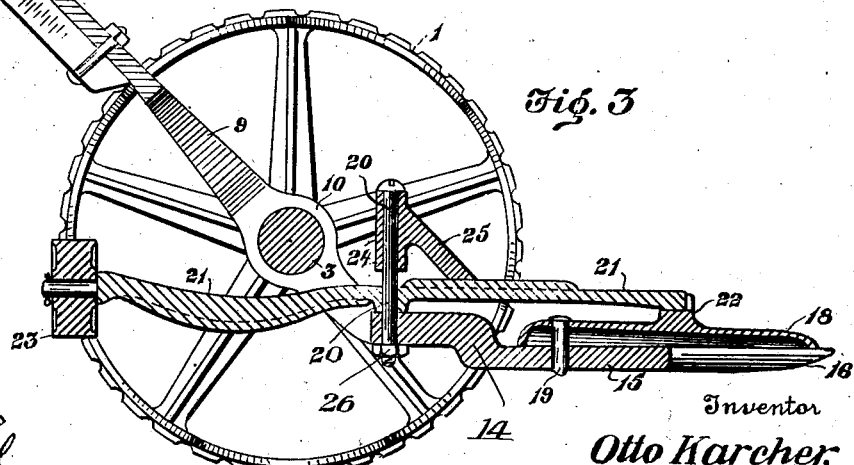
Witnesses
Inventor
Otto Karcher.
By Harry Frease
Attorney

UNITED STATES PATENT OFFICE.

OTTO KARCHER, OF CANTON, OHIO.

LAWN-TRIMMER.

1,037,634.  Specification of Letters Patent.  Patented Sept. 3, 1912.

Application filed January 2, 1912. Serial No. 668,953.

*To all whom it may concern:*

Be it known that I, OTTO KARCHER, a citizen of the United States, residing at Canton, in the county of Stark and State of Ohio, have invented certain new and useful Improvements in Lawn-Trimmers, of which the following is a specification.

The invention relates to lawn mowers and more particularly to a clipping machine for trimming the grass around trees and shrubbery, in the angles of buildings and fences, and at other places not readily reached by the more ordinary types of lawn mowers; and the object of the invention is to provide an efficient machine of simple parts, constructed and arranged with the operating mechanism contained and shielded within a relatively short traction drum, so that the cutting blades may be presented directly to the work and passed freely alongside and beyond and around lateral obstructions without the same coming in contact with the traction drum.

Other important features of the invention pertain to the construction and arrangement of the operating parts to effect an automatic pressure of one cutting blade against the other when the machine is pushed forward in operation; together with special means for positively adjusting such pressure, all without the use of springs or other uncertain or yielding means.

The objects of the invention, thus set forth in general terms, are attained by the mechanism, construction and arrangement illustrated for a preferred embodiment thereof in the accompanying drawing, forming part hereof, in which—

Figure 1 is a plan view of the lawn trimmer showing the handle broken away; Fig. 2, a plan section of the lawn trimmer on line 2—2, Fig. 3; and Fig. 3, an elevation section of the lawn trimmer on line 3—3, Figs. 1 and 2.

Similar numerals refer to similar parts throughout the drawing.

The traction drum 1 is composed of two traction wheels 2 and 2ª spaced apart and secured together by the axle 3, parts of which may be formed on each wheel and joined by a suitable tongue and socket coupling as 4 and the pin 5, as shown. Peripheral flanges 6 and 6ª are provided on the inner sides of the wheels, the edges of which flanges terminate in a series of cusps 7 alternately positioned in staggered relation with respect to each other and together forming a tortuous circumferential cam slot between the wheels in the periphery of the roller; and the planes of the apices of the cusps on the several wheels are so spaced apart as to leave a free annular interval between them.

The frame of the machine is composed of a substantially O-shaped body portion 9 located within the traction drum and having bearings 10 formed on each side mounted on journals 11 which are provided on the axle adjacent to the inner side of each wheel; from which O-shaped body portion a shank 12 extends rearward through the annular interval, on which shank is formed or secured the handle 13; and from which O-shaped body portion a shank 14 extends forward through the free portion of the cam slot, on which forward shank is formed or secured the relatively fixed cutting blade 15 which is provided with tapered cutting teeth 16 on its forward edge.

The oscillating cutting blade 17 provided with tapered cutting teeth 18 on its forward edge rests flatwise on the upper side of the fixed cutting blade, to which it is preferably connected by means of the pivot bolt 19 located in the rear middle part of the blades, on which pivot bolt the upper blade is adapted to oscillate so that the lateral edges of its teeth will shear against the lateral edges of the teeth of the fixed cutting blade.

The upright pivot post 20 is provided at the forward end of the O-shaped body portion of the frame, on which post is pivoted the operating arm 21, the forward end of which arm abuts and is engaged with the central part of the oscillating blade, as in the U-shaped boss 22 thereon; and the rear end of the operating arm is provided with the roller 23 located and adapted to operate in the tortuous circumferential cam groove in the traction drum, whereby an oscillating movement is given to the pivoted cutter blade by a rotation of the drum. The operating bar 21 is preferably loosely journaled on the pivot post 20 to permit a slight vertical oscillation of the bar, and a fulcrum is provided for the upper side of the bar preferably by means of the sleeve 24 adjustably secured on the upper end of the pivot post and the fulcrum arm 25 extending downward and forward from the sleeve with its end abutting the upper side of the operating arm intermediate its pivot and its forward end. The pivot post is preferably made in the form of a bolt, as shown, and the adjustment of the fulcrum arm is readily made by the nut 26 thereof.

By this construction and arrangement, it is evident that the upward rotation of the cusps 7 at the rear side of the traction drum, when the machine is being pushed forward, serves to force the roller and the rear end of the operating bar upward and the forward end thereof downward to press centrally against the oscillating cutting blade and thereby to press the teeth thereof flatwise and throughout their entire length against the teeth of the fixed cutting blade; and that this pressure is proportioned upon the resistance encountered by the cutting teeth and the greater power applied to the cam roller to oscillate the same, so that the pressure of the teeth together will be more positive when the shearing work to be performed is greater.

I claim:

1. A lawn trimmer including a traction drum with an axle therein and having a circumferential cam slot, a frame in the drum journaled on the axle and having shanks extending rearward and forward through the cam slot, a handle on the rearward shank and a blade fixed on the forward shank external to the drum, an oscillating blade pivoted on the upper side of the fixed blade, an operating arm loosely pivoted on the frame and having the forward end extended through the cam slot and engaged with the pivoted blade with a roller on the rear end of the arm in the cam slot for oscillating the pivoted blade, and a fulcrum connected with the frame abutting the operating arm whereby the pivoted blade is pressed flatwise against the fixed blade when the drum is rotated in forward direction.

2. A lawn trimmer including a traction drum with an axle therein and having a circumferential cam slot between its edges, a frame in the drum journaled on the axle and having shanks extending rearward and forward through the cam slot, a handle on the rearward shank and a blade fixed on the forward shank external to the drum, an oscillating blade secured on the upper side of the fixed blade, an operating arm loosely pivoted on the frame and having the forward end extended through the cam slot and engaged with the upper blade with a roller on the rear end of the arm in the cam slot for oscillating the upper blade, and a fulcrum connected with the frame abutting the operating arm whereby the oscillating blade is pressed flatwise against the fixed blade when the drum is rotated in forward direction.

3. A lawn trimmer including a traction drum with an axle therein and having a circumferential cam slot, a frame journaled on the axle and having a blade fixed thereon in front of the drum, an oscillating blade pivoted on the upper side of the fixed blade, an operating arm loosely pivoted on the frame and having its forward end engaged with the pivoted blade with a roller on its rear end in the cam slot at the rear of the drum for oscillating the pivoted blade, whereby the pivoted blade is pressed flatwise against the fixed blade when the drum is rotated in forward direction.

4. A lawn trimmer including a traction drum with an axle therein and having a circumferential cam slot, a frame journaled on the axle and having a blade fixed thereon in front of the drum, an oscillating blade secured on the upper side of the fixed blade, an operating arm loosely pivoted on the frame and having its forward end engaged with the upper blade with a roller on its rear end in the cam slot at the rear of the drum for oscillating the upper blade, whereby the oscillating blade is pressed flatwise against the fixed blade when the drum is rotated in forward direction.

5. A lawn trimmer including a traction drum with an axle therein and having a circumferential cam slot, a frame journaled on the axle and having a blade fixed thereto in front of the drum, an oscillating blade pivoted on the upper side of the fixed blade, an upright pivot post on the frame, an operating arm loosely journaled on the post, and having its forward end engaged with the pivoted blade, there being a roller on the rear end of the arm in the cam slot at the rear of the drum for oscillating the pivoted blade, and an adjustable arm on the pivot post forming a fulcrum for the operating arm, whereby the pivoted blade is pressed flat-wise against the fixed blade when the drum is rotated in forward direction.

6. A lawn trimmer including a traction drum with an axle therein and having a circumferential cam slot, a frame journaled on the axle and having a blade fixed thereto in front of the drum, an oscillating blade on the upper side of the fixed blade, an upright pivot post on the frame, an operating arm loosely journaled on the post, and having its forward end engaged with the upper blade, there being a roller on the rear end of the arm in the cam slot at the rear of the drum for oscillating the upper blade, and an adjustable arm on the pivot post forming a fulcrum for the operating arm, whereby the oscillating blade is pressed flatwise against the fixed blade when the drum is rotated in forward direction.

OTTO KARCHER.

Witnesses:
 RUTH A. MILLER,
 FERD J. ZETTLER.